April 15, 1947.  L. C. PACKER  2,419,156
MOTOR
Filed Nov. 10, 1944
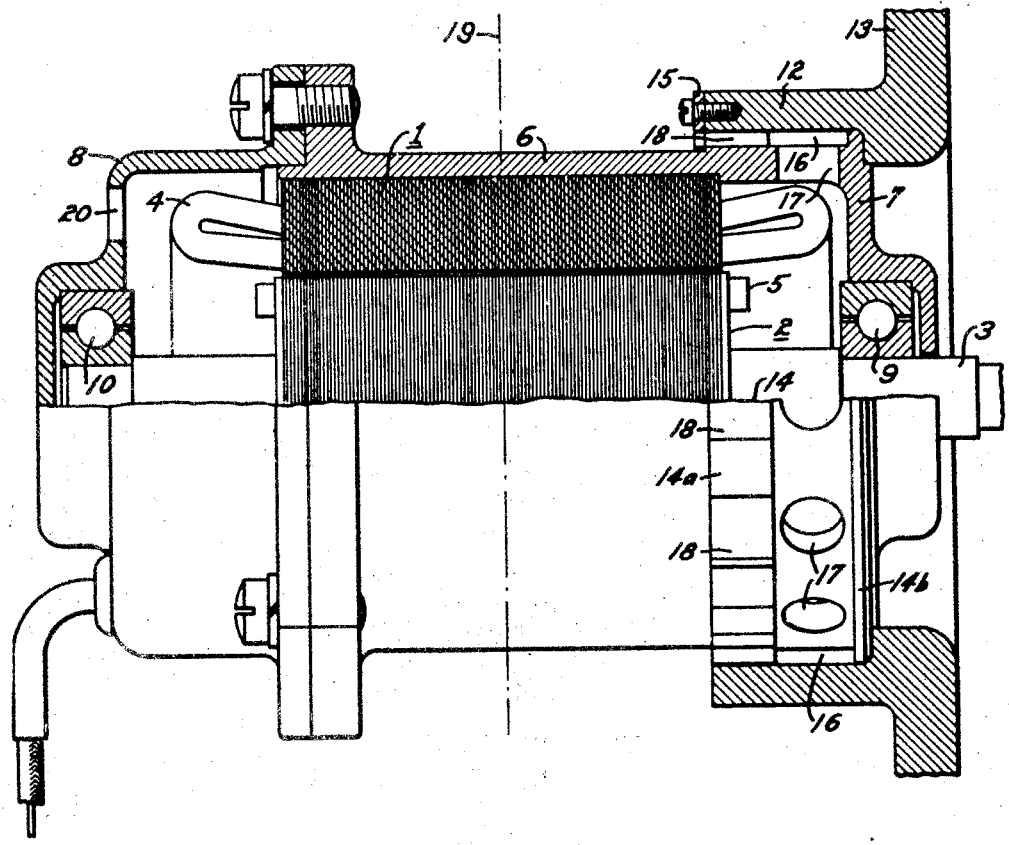
WITNESSES:
Wm. B. Sellers.
INVENTOR
Lewis C. Packer.
BY
ATTORNEY Patented Apr. 15, 1947

2,419,156

UNITED STATES PATENT OFFICE 2,419,156

MOTOR

Lewis C. Packer, Longmeadow, Mass., assignor to Westinghouse Electric Corporation, East Pittsburgh, Pa., a corporation of Pennsylvania Application November 10, 1944, Serial No. 562,793

6 Claims. (Cl. 171—252)

My invention relates to the ventilation of special electric motors or other dynamo-electric machines. While the invention is susceptible of other uses, it is primarily adapted for specially designed and specially mounted servo-motors, having an overhung mounting, or a support from only one end of the motor, and having such stringent requirements as to a very low moment of inertia, for fast acceleration, that the rotor-member frequently cannot include even the simplest kind of ventilating-fan.

In order to obtain a low moment of inertia, the rotor-member must be designed with a relatively small diameter and a relatively long length, as compared to more conventional motor-designs. The shaft of the servo-motor extends out of the motor-frame at one end, and projects into the housing of the gearing or other machinery which is to be controlled by the servo-motor. In order to accurately maintain the position of the motor-axis, the entire servo-motor is supported, at its shaft-end or load-end, within an accurately fitting cup or socket, which is provided on the outside of the machinery-housing on which the servo-motor is mounted, so that the motor is overhung from this mounting. Because of the relatively long length of the motor, and its overhung mounting, it is desirable to make the motor-frame integral with the end bracket at the mounted end, in order to provide the necessary rigidity, and the mounted end of this frame is inserted into the pilot-fitting or mounting-socket far enough to insure a rigid positioning of the motor.

It thus happens that one end of the motor is covered by the pilot-fitting or mounting-socket, so that motor-ventilation becomes a serious problem, particularly in cases where, for various reasons, it is impossible to bore enough radial ventilating-holes through the mounting-socket, and on into the motor-frame, to properly ventilate the motor.

The object of my invention is to provide a novel ventilating-means for a motor of the type just described.

An illustrative embodiment of my invention is shown in the accompanying drawing, the single figure of which is a view of a servo-motor, partly in side elevation and partly in longitudinal section.

While my invention is applicable to direct-current motors as well as alternating-current motors, it is illustrated in connection with a reversible, variable-speed, intermittent-duty, two-phase servo-motor, rated at 55 volts, 240 cycles, and 440 R. P. M., designed with a drooping speed-torque characteristic, and having a low inertia and a high starting-torque, so as to have an extremely high acceleration when the motor is started up in either direction.

As shown in the drawing, the motor comprises a stator-member 1 and a rotor-member 2, the latter being mounted on a shaft 3 which extends out of the motor at the load-end thereof. The stator-member 1 has primary windings 4, and the rotor-member 2 has a squirrel-cage or other secondary winding 5.

A characteristic feature of the stator-member 1 is a long frame 6 which is integral with the bracket 7 at the load-end of the motor. The open end of the frame 6 is closed by a separate end-bracket 8 which is closely fitted, and suitably secured, to the frame 6, so as to enclose the end opposite to the load-end of the motor. The two bracket-portions 7 and 8 carry bearings 9 and 10, respectively, for rotatably supporting the shaft 3.

A still more characteristic feature of the stator-member 1 is its overhung mounting-arrangement, whereby its load-end 7 is supported within a pilot-fitting in the form of a cup or socket-member 12 which is provided on the outside of a machinery-housing or casing 13 which houses the machinery (not shown) to be driven by the motor. In order to hold the motor in an accurate predetermined alinement or position on the supporting-frame 13, the socket-receiving end of the motor-frame 6 is provided with an accurately ground collar or thickened frame-portion 14 which fits closely into the socket 12, and is held seated firmly in place by clamps 15.

The collar 14 of the motor-frame is provided with a circumferential groove 16 which, in effect, divides the collar 14 into an inner collar-portion 14a and an outer collar-portion 14b, the latter extending furthest into the socket 12 of the supporting-frame 13.

The motor-ventilation is dependent upon the natural ventilation of its rotor-member. Ventilation is provided at the load-end by a plurality of radial ventilating-holes 17 which are drilled through the bottom of the circumferential groove 16, and a plurality of axially extending grooves or flutes 18 which are cut into the outer periphery of the inner collar-portion 14a, or the portion of the collar 14 which is closest to the center-line 19 of the motor. The axial grooves 18 are preferably in axial alinement with the ventilating holes 17.

At the other end of the motor, ventilation is provided by means of ventilating-openings 20 which are provided in the end-bracket 8 in the usual manner.

In operation, the axial grooves 18, the circumferential groove 16, and the radial holes 17 afford ventilating passages whereby air can get into the motor, at the load-end 7, through the grooves or flutes 18, and thence through the holes 17. The provision of the circumferential groove 16, at the junction-points between the radial holes 17 and the axial grooves 18, provides an enlargement in the ventilating-passages in the places where there is a change in the direction of the airflow, and it thus considerably increases the amount of ventilation.

My ventilating-arrangement, as shown and described, has worked out very well in practice. For example, a motor which had a maximum temperature-rise of 41° C. when operating enclosed, has a maximum temperature-rise of 28° C. when provided with the holes 17 and flutes 18, without the circumferential groove 16, but when the circumferential groove 16 was also added, in addition to the radial holes 17 and the axial grooves or flutes 18, the motor had a maximum temperature-rise of only 18° C. This shows that my improved ventilating-means makes it possible to utilize a smaller motor, for a given required rating of output; and a smaller size of motor means a motor having a smaller moment of inertia, which was one of the primary prerequisites of the servo-motor for which my invention was originaly designed.

At the same time, my improved ventilating and mounting arrangements provide an extremely rigid construction which is well able to withstand severe shocks.

I claim as my invention:

1. An overhung-mounted dynamo-electric machine, comprising a stator-member and a rotor-member, said rotor-member having a shaft which extends out of the dynamo-electric machine at the supported end of the machine, said stator-member having a frame having a pilot-fit peripheral portion at its supported end, said pilot-fit portion being accurately surfaced to adapt it to accurately aline the motor within a socket-shaped supporting-member, and ventilating-means comprising a plurality of interconnected radial and axial ventilating passages in said pilot-fit portion of the frame, said axial passages being peripheral grooves in said axial-fit portion.

2. The invention as defined in claim 1, characterized by said radial and axial ventilating passages being axially alined with each other and having enlargements in the ventilating passageways at their junctions.

3. The invention as defined in claim 1, characterized by said pilot-fit portion of the frame having a peripheral circumferential groove therein, spaced from both ends of said pilot-fit portion, said radial passages being holes in the bottom of said circumferential groove.

4. An overhung-mounted dynamo-electric machine, comprising a stator-member and a rotor-member, said rotor-member having a shaft which extends out of the dynamo-electric machine at the supported end of the machine, said stator-member having an elongated frame which is integral with the end-bracket at the supported end of the machine, said stator-member further having a separate ventilated end-bracket closing the open end of the frame at the end opposite to the supported end of the machine, said frame having a collar-portion at the supported end of the machine, the outer surface of said collar-portion being accurately surfaced to provide a pilot-fit portion adapted to accurately aline the motor within a socket-shaped supporting-member, and ventilating-means comprising a plurality of interconnected radial and axial ventilating passages in said pilot-fit portion of the frame, said axial passages being peripheral grooves in said axial-fit portion.

5. The invention as defined in claim 4, characterized by said radial and axial ventilating passages being axially alined with each other and having enlargements in the ventilating passageways at their junctions.

6. The invention as defined in claim 4, characterized by said pilot-fit portion of the frame having a peripheral circumferential groove therein, spaced from both ends of said pilot-fit portion, said radial passages being holes in the bottom of said circumferential groove.

LEWIS C. PACKER.

REFERENCES CITED

The following references are of record in the file of this patent:

UNITED STATES PATENTS

| Number | Name | Date |
| --- | --- | --- |
| 2,196,952 | Bagaty | Apr. 9, 1940 |